United States Patent
Dournov et al.

(10) Patent No.: US 8,365,009 B2
(45) Date of Patent: Jan. 29, 2013

(54) CONTROLLED AUTOMATIC HEALING OF DATA-CENTER SERVICES

(75) Inventors: Pavel A. Dournov, Sammamish, WA (US); Haizhi Xu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 12/879,412

(22) Filed: Sep. 10, 2010

(65) Prior Publication Data

US 2012/0066541 A1    Mar. 15, 2012

(51) Int. Cl.
    *G06F 11/00* (2006.01)
(52) U.S. Cl. .................... 714/4.11; 709/223; 709/226
(58) Field of Classification Search .................. None
    See application file for complete search history.

(56) References Cited

U.S. PATENT DOCUMENTS

| | | | |
|---|---|---|---|
| 6,944,785 B2 | 9/2005 | Gadir | |
| 7,392,302 B2 | 6/2008 | Halpern | |
| 2002/0145983 A1* | 10/2002 | Block et al. | 370/254 |
| 2003/0182427 A1* | 9/2003 | Halpern | 709/226 |
| 2004/0044760 A1* | 3/2004 | Deily et al. | 709/223 |
| 2006/0195715 A1* | 8/2006 | Herington | 714/4 |
| 2007/0083794 A1* | 4/2007 | Yu | 714/38 |
| 2007/0260733 A1* | 11/2007 | Havemose et al. | 709/226 |
| 2008/0140690 A1 | 6/2008 | Cuomo | |
| 2008/0256149 A1 | 10/2008 | Bansal | |
| 2008/0270487 A1 | 10/2008 | Weijun | |
| 2009/0178046 A1 | 7/2009 | Jain | |
| 2010/0042721 A1 | 2/2010 | Steinder | |

OTHER PUBLICATIONS

Automatic Service Migration in WebLogic Server—Published Date: Jul. 2008.
Wang, Chao, et al., Proactive Process-Level Live Migration in HPC Environments—Published Date: Nov. 2008.
Krish, Sujith, Microsoft Application Center 2000—An Introduction—Published Date: Mar. 17, 2004.
TechNet Webcast: Introduction to Failover Clustering (Level 100)—Published Date: Mar. 18, 2009.
Li, Jingyuan, et al., Predictive Dependency Constraint Directed Self-Healing for Wireless Sensor Networks—Published Date: Jun. 2010.
International Search Report and Written Opinion of PCT/US2011/050572, mailed Mar. 20, 2012.

* cited by examiner

*Primary Examiner* — Scott Baderman
*Assistant Examiner* — Jason Bryan
(74) *Attorney, Agent, or Firm* — Shook Hardy & Bacon LLP (57) ABSTRACT

Subject matter described herein is directed to reallocating an application component from a faulty data-center resource to a non-faulty data-center resource. Background monitors identify data-center resources that are faulty and schedule migration of application components from the faulty data-center resources to non-faulty data-center resources. Migration is carried out in an automatic manner that allows an application to remain available. Thresholds are in place to control a rate of migration, as well as, detect when resource failure might be resulting from data-center-wide processes or from an application failure.

16 Claims, 4 Drawing Sheets

CONTROLLED AUTOMATIC HEALING OF DATA-CENTER SERVICES

BACKGROUND

A data center consists of networked computer resources (e.g., servers, discs, virtual machines, etc.), sometimes referred to as a cloud, that are leveraged to deploy hosted applications. Doing so, a distributed application can achieve a level of availability that is higher than the availability of the underlying hardware. That is, sometimes the underlying hardware might enter a faulty state (e.g., investigative or repair) at a time during which the application is assigned to and is utilizing the resources. As such, it is helpful to have measures in place to reallocate the application from the faulty resource to a non-faulty resource, thereby allowing the application to maintain availability. Moreover, it is helpful to reallocate the application in a manner that allows the application to remain available, even during the transfer.

SUMMARY

Embodiments of the invention are defined by the claims below, not this summary. A high-level overview of subject matter described herein is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

Subject matter described herein is directed to reallocating an application component from a faulty data-center resource to a non-faulty data-center resource. Background monitors identify data-center resources that are faulty and schedule migration of application components from the faulty data-center resources to non-faulty data-center resources. Migration is carried out in an automatic manner that allows an application to remain available. Thresholds are in place to control a rate of migration, as well as, detect when resource failure might be resulting from data-center-wide processes or from an application failure.

BRIEF DESCRIPTION OF THE DRAWINGS

Illustrative embodiments of the present invention are described in detail below with reference to the attached drawing figures, wherein.

DETAILED DESCRIPTION

Subject matter is described herein with specificity to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Generally, an embodiment of the present invention is directed to reallocating an application component from a faulty data-center resource to a non-faulty data-center resource. As used herein "application component" describes at least a portion of an application that is deployed on a data-center resource and that is executed together with one or more other application components to achieve a desired functionality of the application. An application component is sometimes referred to as "an instance," "a role instance," or "an application role instance." A "data-center resource" includes a computing resource of a data center, such as a server (also referred to as a "node"), a disc, or a virtual machine (VM). Typically, a data center includes a quantity (e.g., thousands) of individual resources that are connected to form a network of resources.

Often, an application includes instructions (also referred to as an "application model" or "application-deployment parameters") that specify how the application is to be deployed among a network of resources. For example, the instructions might direct that the application be deployed as 50 role instances (i.e., application components) equally among five different data-center resources (e.g., servers), each of which includes a separate power source. Accordingly, ten role instances would be deployed on each of five resources. Each set of ten role instances might be designated as a respective virtual grouping (also referred to as "upgrade domains"). Often, based on application model availability constraints, virtual groupings are not allowed to be upgraded or migrated at the same time.

Continuing with this example, if one of the five resources fails, an embodiment of the invention migrates the ten application components from the failed resource to a healthy resource. Moreover, the ten application components are reallocated in a manner that is consistent with the application model. That is, a migration of the ten application components is completed before a reallocation, or any other maintenance operation, of any other application components is initiated, thereby obeying virtual-grouping-migration requirements. In addition, the healthy resource(s) that receives the ten application components is(are) not one of the four resources on which the other 40 application components are deployed, thereby obeying the parameter requiring five different data-center resources.

Figure 1:
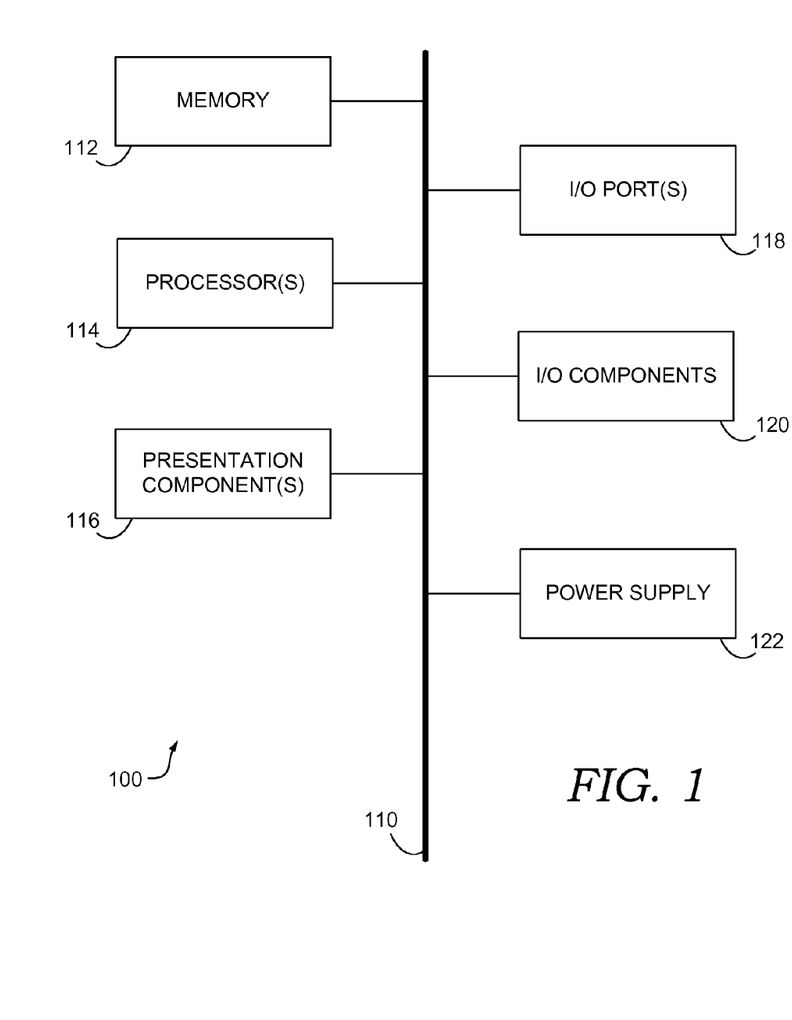
FIG. 1 is a block diagram depicting an exemplary computing device suitable for use in accordance with embodiments of the invention.

Having briefly described embodiments, FIG. 1 is now described in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention might be practiced in a variety of system configurations, including handheld devices, consumer electronics, general-purpose computers, more specialty computing devices, etc.

Embodiments of the invention might also be practiced in distributed computing environments where tasks are performed by remote-processing devices that are linked through a communications network.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media might include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
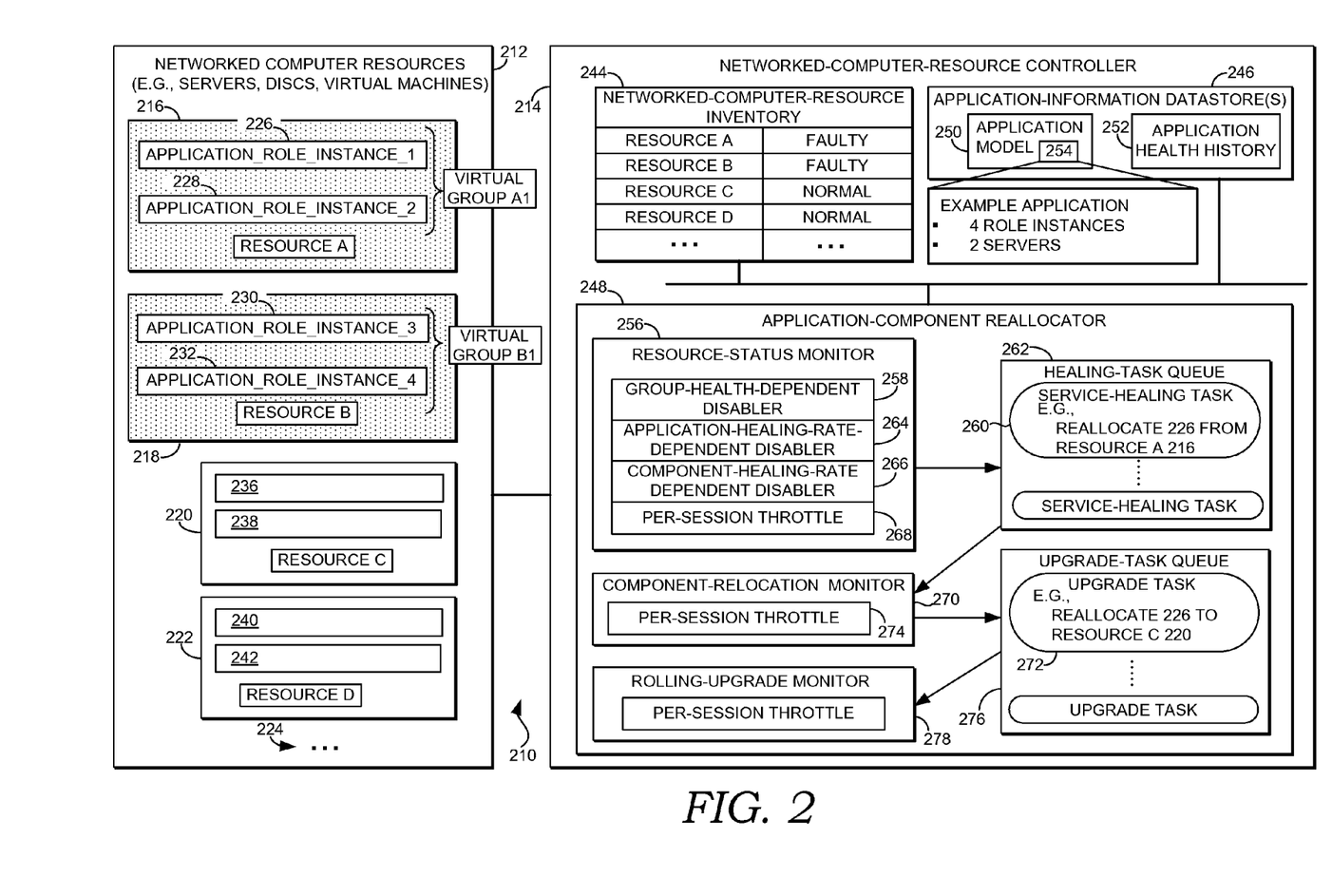
FIG. 2 is a block diagram of an exemplary operating environment in accordance with an embodiment of the present invention.

Referring now to FIG. 2, an exemplary operating environment suitable for practicing an embodiment of the invention is depicted and identified generally by reference numeral 210. Environment 210 includes a set of networked data-center computer resources 212 and a controller 214, which monitors, maintains, and assigns resources 212 to host applications deployed in the data center.

Resources 212 include Resource A 216, Resource B 218, Resource C 220, and Resource D 222. Resources A-D are depicted for illustrative purposes; however, resources 212 might include several other resources (e.g., thousands), as indicated by ellipsis 224.

In FIG. 2 an application has been deployed using Resource A 216 and Resource B 218. Resource A 216 includes application role instance 1 226 and application role instance 2 228, and Resource B 218 includes application role instance 3 230 and application role instance 4 232. That is, an application (e.g., "Example Application" identified in application model 250) has been deployed using Resource A 216 and Resource B 218, and the application includes at least four role instances. Moreover, the four role instances (i.e., 226, 228, 230, and 232) are divided into virtual groupings (e.g., upgrade domain). For example, virtual group A1 includes role instance 1 226 and role instance 2 228, and virtual group B1 includes role instance 3 230 and role instance 4 232. Although only four role instance are depicted in FIG. 2 for illustrative purposes, the application might include several other role instances deployed among other resources and divided into larger and more numerous virtual groupings.

Resource A 216 and Resource B 218 are shaded to depict a faulty state. A resource might be deemed to include a faulty state for various reasons, such as when the resource is in a manual-investigation state (e.g., HumanInvestigative (HI) state) or a repair state (e.g., "OutForRepair"). Resources 212 also include Resource C 220 and Resource D 222 both of which are not shaded to depict a non-faulty state. Moreover, each of Resource C 220 and Resource D 222 includes availability to receive application components (e.g., application role instances) as indicated by empty boxes 236, 238, 240, and 242.

Controller 214 (e.g., fabric controller) includes various components that communicate with one another and that include a networked-computer-resource inventory 244, an application-information datastore 246, and an application-component reallocator 248. As previously indicated, controller 214 monitors, maintains, and assigns resources 212 to host applications deployed in the data center. As such, inventory 244 includes a listing of all resources included among resources 212, as well as, an indication of the health or status of each resource. For example, inventory 244 lists Resource A and indicates that Resource A includes a faulty status. That is, "Resource A" listed in inventory 244 corresponds with Resource A 216 depicted among resources 212. Likewise, inventory 244 also lists Resources B-D, as well as, a respective indication of status.

Application-information datastore 246 stores information related to an application that is deployed using resources 212. Exemplary types of information stored in datastore 246 include an application model 250 and an application-health history 252. For exemplary purposes herein, information stored in datastore 246 relates to the same application that is described as being deployed on Resource A 216 and Resource B 218. That is, "Example Application" identified in an exploded view of information 254 is deployed using Resource A 216 and Resource B 218. Application model 250 indicates that, when deployed, Example Application is to include four instances divided among two servers. Application-health history 252 tracks a number of times or occasions that an application has been reallocated throughout a period of time, as well as, a number of times that a particular application component (e.g., instance) has been reallocated throughout a period of time. As will be described in more detail hereinafter, such metrics are useful to identify when an application and/or and application component might be causing a faulty status, as opposed to underlying hardware.

Controller 214 also includes an application-component reallocator 248. Reallocator 248 includes various monitors that function together to identify faulty resources, determine available and appropriate (i.e., application-model consistent) non-faulty resources, and migrate application components from faulty resources to non-faulty resources in accordance with application model 250.

Component reallocator 248 includes a resource-status background monitor 256, which identifies resources (e.g., server, disc, or VM) that include a faulty state. In one embodiment, when resource-status background monitor 256 wakes up, it references inventory 244 to identify resources that include a faulty status. For example, resource-status background monitor 256 might reference inventory 244 to determine that Resource A 216 includes a faulty status. As previously described, Resource A 216 hosts application role instance 1 226 and application role instance 2 228. Because Resource A 216 has failed, it is desirable to reallocate application role instance 1 226 and application role instance 2 228 to allow the Example Application to maintain availability.

Upon identifying a faulty resource, resource-status background monitor 256 generates a service-healing task 260, which is maintained in a healing-task queue 262. Service-healing task 260 includes instructions that an application component needs to be reallocated from an identified faulty resource. For example, as depicted in FIG. 2, service-healing task 260 might include instructions that application role instance 1 226 needs to be reallocated from Resource A. Although not expressly depicted, task 260 might likewise include instructions that role instance 2 228 needs to be reallocated from Resource B.

It is possible that a resource enters a faulty status due to a group-wide condition (i.e., network-wide condition), such as a failure in deployment of a datacenter control-software upgrade, configuration change, or a massive hardware failure. In such a scenario, it might be desirable to pause at least some operations of the controller 214 to allow for an investigation or to otherwise protect application components. As such, reallocation might be undesirable as it could interfere with an investigation, reallocate from non-faulty nodes, or otherwise fail to restore health of resources allocated to an application. Accordingly, resource-status background monitor 256 includes group-health-dependent disabler 258. Before generating service-healing tasks (e.g., 260), disabler 258 determines whether a number of faulty resources among a group of resources exceeds a group-health threshold. A group-health threshold is configurable and might include a threshold number of faulty resources or a ratio of faulty resources to non-faulty resources. As such, disabler 258 determines from inventory 244 a quantity of faulty resources and compares that quantity to the group-health threshold. If the quantity is below the threshold, resource-status background monitor 256 proceeds. However, if the quantity exceeds the threshold, resource-status background monitor 256 is disabled, thereby suspending healing operations.

It is also possible that an application defect causes a resource to enter a faulty state, such that continuous reallocation of the application contaminates subsequent resources. Accordingly, resource-status background monitor 256 includes an application-healing-rate-dependent disabler 264. Before service-healing tasks (e.g., 260) are generated, disabler 264 determines an application's healing frequency (i.e., how many times an application has been healed in a given period of time). For example, application-health history 252 might be referenced to determine how many times an application has been healed in a certain period of time. Disabler 264 compares an application's healing frequency to an application-healing-rate threshold. When the application's healing frequency is below the application-healing-rate threshold, resource-status background monitor 256 proceeds. However, when the application's healing frequency exceeds the application-healing-rate threshold, disabler 264 disables further healing attempts for the application. In addition, an alarm or notification might be sent out indicating that the application should be investigated.

An application-healing-rate threshold might be determined using various methods. For example, the application-healing-rate threshold might be heuristically determined based on experience. Alternatively (or in addition), the application-healing-rate threshold might be based on a calculated probability of a resource (e.g., server) entering a faulty state, which is not caused by an application defect. In one embodiment, the calculated probability is determined using a Poisson distribution. That is, a Poisson distribution expresses a probability of an event (e.g., resource entering a faulty state) occurring in a fixed period of time if the event occurs with a known average rate, regardless of the time since the last event. Accordingly, if an application is hosted on five nodes, a Poisson distribution is used to suggest a frequency with which those five nodes enter a faulty state that is brought about independently and randomly (i.e., not caused by an application defect). Failure by those five nodes more than the frequency suggested by the Poisson-distribution indicates that an application defect might be causing the failures. Accordingly, a Poisson distribution frequency can be used as, or used to suggest, an application-healing-rate threshold.

Similar to an application defect causing a resource to enter a faulty state, an application component (e.g., instance) might include a defect that causes a resource to enter a faulty state. Accordingly, resource-status background monitor 256 includes a component-healing-rate-dependent disabler 266 that functions similarly to application-healing-rate-dependent disabler 264. That is, before service-healing tasks (e.g., 260) are generated, disabler 266 determines component's healing frequency (i.e., how many times the component has been healed in a given period of time). For example, application-health history 252 might be referenced to determine how many times a component has been healed in a certain period of time. Disabler 266 compares a component's healing frequency to a component-healing-rate threshold. When the component's healing frequency is below the component-healing-rate threshold, resource-status background monitor 256 proceeds. However, when the component's healing frequency exceeds the component-healing-rate threshold, disabler 266 disables further healing attempts for the component's application. In addition, an alarm or notification might be sent out indicating that the application component should be investigated.

If unchecked, reallocation by application-component reallocator 248 might generate a large number of tasks without taking into account a workload of controller 214. Accordingly, thresholds might be established to limit a number of tasks that are generated in a reallocation session. That is, resource-status background monitor 256 functions in part by waking from a resting state, identifying faulty resources, creating service-healing tasks, and returning to the resting state. Each time the resource-status background monitor 256 wakes up, it begins a reallocation session.

Accordingly, to manage the workload of controller 214, a cap might be set on an approximate number of applications resource-status background monitor 256 is allowed to reallocate in a given reallocation session. As such, per-session throttle 268 controls a number of applications that are allowed to be reallocated in a reallocation session. When per-session throttle 268 establishes a per-session cap, resource-status background monitor 256 will reallocate approximately the per-session cap, rounded to the next resource boundary. For example, resource-status background monitor 256 might wake up and identify three resources that are faulty, each resource hosting eight applications. If per-session throttle 268 caps the reallocation at ten applications, two of the three resources (i.e., sixteen applications) are reallocated, and the remaining one resource is reallocated in subsequent sessions. That is, when the per-session cap (e.g., ten) is exceeded, the list up to the next resource boundary (e.g., sixteen applications) will be reallocated, but not more.

Component-relocation background monitor 270 consumes service-healing tasks and identifies a non-faulty resource to which an application component can be migrated. For example, upon receiving service-healing task 260 component-relocation background monitor 270 might reference inventory 244 to identify resources that are available to receive application role instance 1 226.

In addition to identifying available non-faulty resources, component-relocation background monitor 270 ensures that migration of application role instance 1 226 to a particular non-faulty resource complies with application model 250. For example, application model 250 specifies that the example application is to be deployed using two servers. Accordingly, even if a single server was available to host each of application role instances 1-4, component-relocation background monitor 270 would not schedule all of those application components to be reallocated to that single server.

Once component-relocation background monitor 270 has identified an available and appropriate resource to which an application component can be reallocated, component-relocation background monitor 270 generates an upgrade task 272. For example, upgrade task 272 instructs reallocation of application role instance 1 226 to Resource C 220. Although not expressly depicted, task 272 might likewise include instructions that role instance 2 228 needs to be reallocated to an available and appropriate resource. An upgrade task (e.g., 272) related to application role instance 2 228 might instruct that application role instance 2 228 should be migrated to either Resource C 220 or Resource D 220, so long as compliance is maintained with application model 250. Upgrade tasks are prioritized in a rolling-upgrade-task queue 276.

Component-relocation monitor 270 might also include a per-session throttle 274, which functions similar to per-session throttle 268. That is, per-session throttle 274 controls a number of applications that are allowed to be reallocated in a reallocation session. When per-session throttle 274 establishes a per-session cap, upon waking component-relocation background monitor 270 processes a number of service-healing tasks that is approximately equal to the cap. That is, component-relocation background monitor 270 might process a number rounded to the next resource boundary, similar to resource-status background monitor 256.

Rolling-upgrade background monitor 278 consumes upgrade tasks and executes reallocation of application components. For example, rolling-upgrade background monitor 278 causes application role instance 1 226 to be reallocated to Resource C. In an embodiment, rolling-upgrade background monitor 278 complies with virtual-grouping rules. For example, rolling-upgrade background monitor 278 might wait for an entire virtual group (e.g., virtual group A1) of an application to be migrated to a new resource before beginning a migration of another virtual group (e.g., virtual group B1) of the same application. In this respect, rolling-upgrade-task queue does not follow a first-in/first-out processing scheme.

Rolling-upgrade background monitor 278 might also include a per-session throttle 280, which functions similar to per-session throttle 268 and per-session throttle 274. That is, per-session throttle 280 controls a number of applications that are allowed to be reallocated in a reallocation session. When per-session throttle 280 establishes a per-session cap, upon waking rolling-upgrade background monitor 278 processes a number of upgrade tasks that is approximately equal to the cap. That is, rolling-upgrade background monitor 278 might process a number rounded to the next resource boundary, similar to resource-status background monitor 256 and component-relocation monitor 270.

Figure 3:
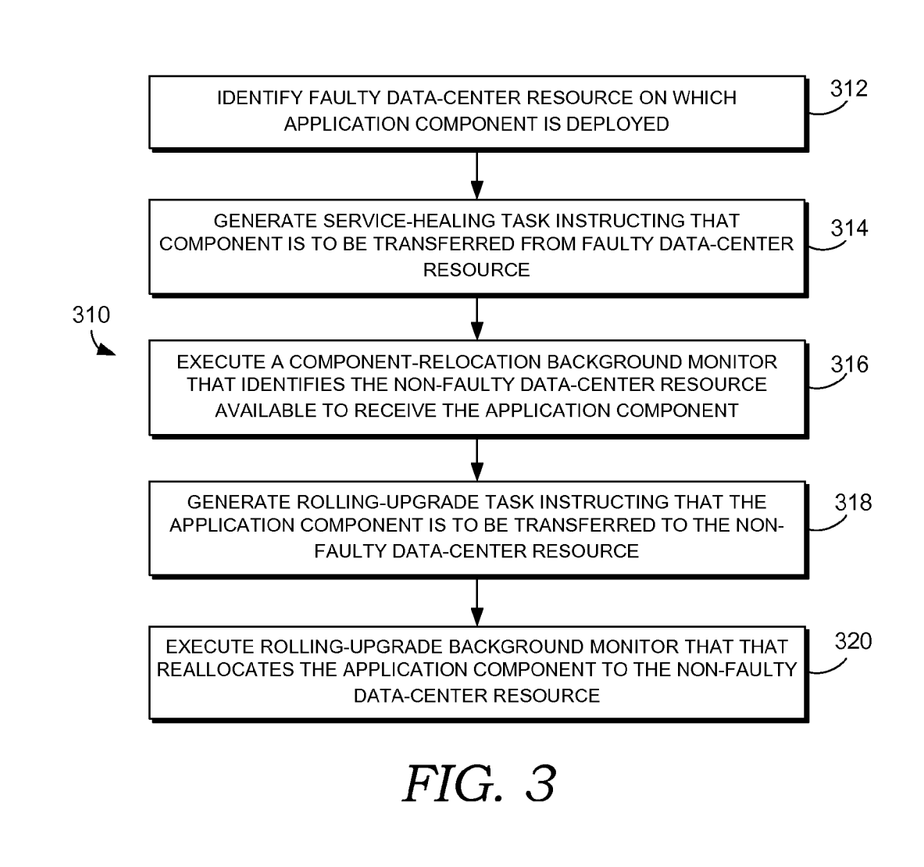
FIGS. 3 and 4 are exemplary flow diagrams in accordance with an embodiment of the present invention.

Referring to FIG. 3, a flow diagram is depicted that outlines a method performed in an embodiment of the present invention. The method is generally depicted by reference numeral 310 and, when describing FIG. 3, reference might also be made to FIG. 2. The method might be embodied on one or more computer-readable media having computer-executable instructions embodied thereon that, when executed, facilitate a method of reallocating an application component from a faulty data-center resource to a non-faulty data-center resource.

Method 310 includes at 312 identifying a faulty data-center resource (e.g., server, disc, virtual machine) on which an application component (e.g., instance 226 and 228) is hosted. For example, a faulty data-center resource might be identified when resource-status background monitor wakes up and references inventory 244. Step 314 includes generating a service-healing task (e.g., 260) instructing that the application component is to be transferred from the faulty data-center resource. For example, after identifying the faulty data-center resource, resource-status background monitor 256 might generate a service-healing task.

At step 316 method 310 includes executing a component-relocation background monitor that consumes the service-healing task and that identifies the non-faulty data-center resource available to receive the application component. For example, applicant model 250 might be checked to determine parameters to be met when reallocating the application component. An exemplary parameter includes a total number of resources (e.g., servers) among which application components are to be apportioned. Inventory 244 might be referenced to determine which resources are not faulty and an available non-faulty resource selected that complies with the parameters.

Step 318 includes generating a rolling-upgrade task (e.g., 272) instructing that the application component is to be transferred to the non-faulty data-center resource. In addition, step 320 includes executing a rolling-upgrade background monitor that consumes the rolling-upgrade task and that reallocates the application component to the non-faulty data-center resource. As previously described, when executing method 310, various thresholds might be utilized to control a workload (e.g., per-session throttles), as well as, detect when resource failure might be resulting from data-center-wide processes (e.g., group-health threshold) or from an application failure (e.g., application-healing-rate threshold).

Figure 4:
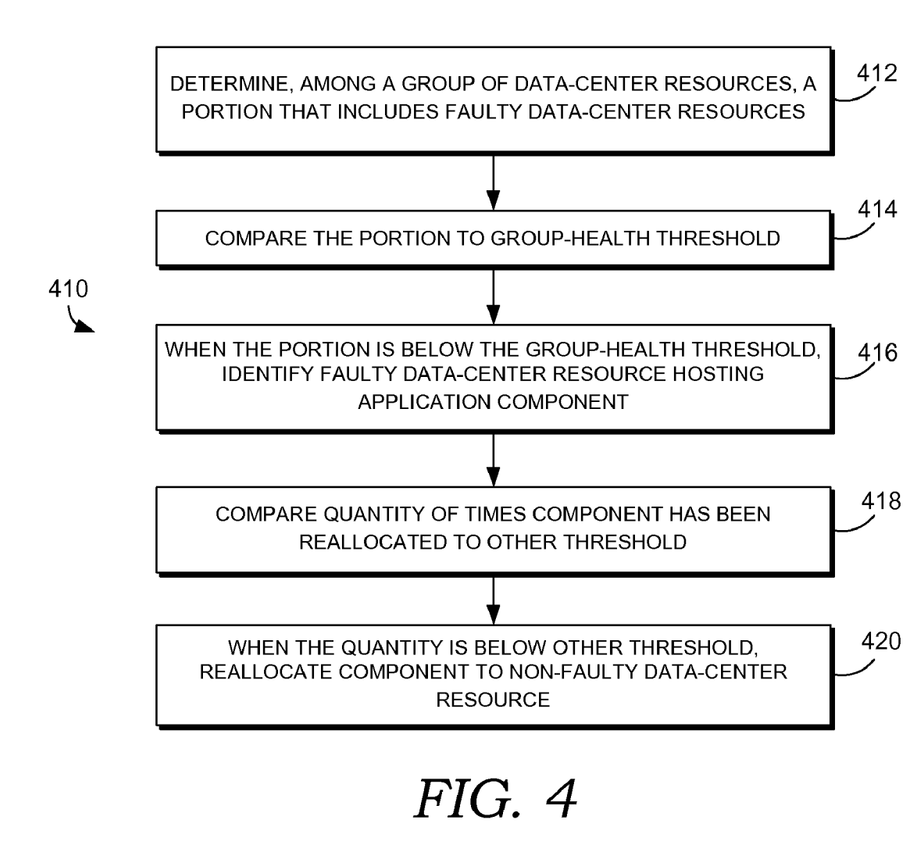

Referring now to FIG. 4, another flow diagram is depicted that outlines a method performed in an embodiment of the present invention. The method is generally depicted by reference numeral 410 and, when describing FIG. 4, reference might also be made to FIG. 2. The method might be embodied on one or more computer-readable media having computer-executable instructions embodied thereon that, when executed, facilitate a method of reallocating an application component from a faulty data-center resource to a non-faulty data-center resource.

At operation 412 method 410 includes determining, among a group of data-center resources, a portion of the group that includes faulty data-center resources. In addition, step 414 includes comparing the portion to a group-health threshold. For example, group-health-dependent disabler 258 might verify that the portion of faulty resources is not too high, which might suggest that a network-wide condition should be taken into account before service healing continues.

Operation 416 includes, when the portion is below the group-health threshold, identifying the faulty data-center resource on which the application component is deployed, wherein the application component has been reallocated a quantity of times in a given time period. Moreover, step 418 includes comparing the quantity of times to another threshold. The other threshold might include an application-healing-rate threshold, a component-healing-rate threshold, or both the application-healing-rate threshold and the component-healing-rate threshold. For example, application-healing-rate-dependent disabler 264 might verify that the quantity of times is not too high, since a high reallocation rate suggests that the application is an underlying cause of resource failure. Furthermore, operation 420 includes, when the quantity is below the other threshold, reallocating the application component from the faulty data-center resource to the non-faulty data-center resource.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of reallocating an application component from a faulty datacenter resource to a non-faulty data-center resource, the method comprising:
   identifying the faulty data-center resource on which the application component is deployed, wherein the application component comprises at least a portion of an application and is executed together with a plurality of application components to perform the application;
   referencing in a datastore an application history that indicates a number of occasions on which the application has been reallocated among a plurality of data-center resources in a given period of time;
   determining whether the number of occasions exceeds a calculated probability distribution frequency, which includes a calculated probability that entry of the plurality of data-center resources into respective faulty states was caused by the application;
   if the number of occasions exceeds the calculated probability distribution frequency suspending service-healing operations; and
   if the number of occasions does not exceed the calculated probability distribution frequency, proceeding with reallocating the application component by:
      generating a service-healing task instructing that the application component is to be transferred from the faulty data-center resource;
      executing a component-relocation background monitor that consumes the service-healing task and that identifies the non-faulty data-center resource available to receive the application component;
      generating a rolling-upgrade task instructing that the application component is to be transferred to the non-faulty data-center resource; and
      executing a rolling-upgrade background monitor that consumes the rolling-upgrade task and that reallocates the application component to the non-faulty data-center resource.

2. The method of claim 1, wherein the faulty data-center resource includes any state deemed unhealthy by a networked-computer-resource controller.

3. The method of claim 1, wherein the application component is an application role instance.

4. The method of claim 1,
   wherein the application component is one component of a set of application components, and
   wherein the set is divided among two or more virtual groupings, such that the application component is in one virtual grouping and another application component of the set is in another virtual grouping.

5. The method of claim 4,
   wherein the one virtual grouping and the other virtual grouping are allocated on respective faulty data-center resources, and
   wherein initiating reallocation of the application component pursuant to the rolling-upgrade task is conditional on completing a reallocation of the other application component in the other virtual grouping.

6. The method of claim 1, wherein, to identify the non-faulty data-center resource, the component-relocation background monitor references an inventory of resources that is maintained by a networked-computer-resource controller.

7. The method of claim 1,
   wherein the faulty data-center resource is included in a network of a plurality of data-center resources,
   wherein, prior to identifying the faulty data-center resource, a portion of the plurality is identified that includes faulty data-center resources, and
   wherein, when the portion exceeds a threshold portion, the service-healing task is not generated.

8. A system that reallocates an application component from a faulty data-center resource to a non-faulty datacenter resource, the system comprising:
   one or more processing units; and
   a computer readable storage memory storing computer-readable instructions that, when executed by the one or more processing units, perform operations comprising:
      identifying the faulty data-center resource on which the application component is deployed, wherein the application component comprises at least a portion of an application and is executed together with a plurality of application components to perform the application;
      referencing in a datastore an application history that indicates a number of occasions on which the application has been reallocated among a plurality of data-center resources in a given period of time;

determining whether the number of occasions exceeds a Poisson distribution frequency, which includes a calculated probability that entry of the plurality of data-center resources into respective faulty states was caused by the application;

if the number of occasions does not exceed the Poisson distribution frequency, proceeding with reallocating the application component by:

generating a service-healing task instructing that the application component is to be transferred from the faulty data-center resource;

executing a component-relocation background monitor that consumes the service-healing task and that identifies the non-faulty data-center resource available to receive the application component;

generating a rolling-upgrade task instructing that the application component is to be transferred to the non-faulty data-center resource; and executing a rolling-upgrade background monitor that consumes the rolling-upgrade task and that reallocates the application component to the non-faulty data-center resource; and if the number of occasions exceeds the Poisson distribution frequency suspending service-healing operations.

9. The system of claim 8 further comprising, a group-health-dependent disabler that determines a ratio of data-center resources that are faulty among a group of datacenter resources, wherein, when the ratio exceeds a threshold ratio, the resource-status background monitor is disabled.

10. The system of claim 8 further comprising, a component-healing-rate-dependent disabler that tracks a number of times that the application component is healed in a given period of time, wherein, when the number of times exceeds a per-component healing-frequency threshold, operations directed to healing the application are disabled.

11. The system of claim 8 further comprising, a per-session throttle that controls a number of application components that the resource-status background monitor is allowed to process in a single reallocation session.

12. The system of claim 8 further comprising, a per-session throttle that controls a number of application components that the component-relocation background monitor is allowed to process in a single reallocation session.

13. The system of claim 8 further comprising, a per-session throttle that controls a number of application components that the upgrade background monitor is allowed to process in a single reallocation session.

14. A computer readable storage memory storing computer-executable instructions that, when executed, facilitate a method of reallocating an application component from a faulty data-center resource to a non-faulty data-center resource, the method comprising:

determining, among a group of data-center resources, a portion of the group that includes faulty data-center resources;

comparing the portion to a group-health threshold;

when the portion is below the group-health threshold, identifying the faulty data-center resource on which the application component is deployed, wherein the application component comprises at least a portion of an application and is executed together with a plurality of application components to perform the application, and wherein the application component has been reallocated a quantity of times in a given time period;

comparing the quantity of times to a Poisson distribution frequency, which includes a calculated probability that entry of the plurality of data-center resources into respective faulty states was caused by the application; and when the quantity is below the Poisson distribution frequency, reallocating the application component from the faulty data-center resource to the non-faulty data-center resource.

15. The computer readable storage memory of claim 14, wherein the application component is one component of a set of application components, and wherein the set is divided among two or more virtual groupings, such that the application component is in one virtual grouping and another application component of the set is in another virtual grouping.

16. The computer readable storage memory of claim 15, wherein the one virtual grouping and the other virtual grouping are allocated on respective faulty data-center resources, and wherein reallocating the application component is conditional on completing a reallocation of the other application component in the other virtual grouping.

* * * * *